US010050659B2

United States Patent
Choi et al.

(10) Patent No.: US 10,050,659 B2
(45) Date of Patent: *Aug. 14, 2018

(54) SYSTEMS AND METHODS FOR NON-LINEAR DIGITAL SELF-INTERFERENCE CANCELLATION

(71) Applicant: Kumu Networks, Inc., Sunnyvale, CA (US)

(72) Inventors: Jung-Il Choi, Sunnyvale, CA (US); Mayank Jain, Sunnyvale, CA (US); Jeff Mehlman, Sunnyvale, CA (US); Steven Hong, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,225

(22) Filed: Apr. 25, 2017

(65) Prior Publication Data

US 2017/0279480 A1 Sep. 28, 2017

Related U.S. Application Data

(63) Continuation of application No. 14/607,571, filed on Jan. 28, 2015, now Pat. No. 9,667,299, which is a
(Continued)

(51) Int. Cl.
*H04L 5/14* (2006.01)
*H04B 1/40* (2015.01)
(Continued)

(52) U.S. Cl.
CPC .............. *H04B 1/40* (2013.01); *G06F 7/483* (2013.01); *G06F 17/11* (2013.01); *H04B 1/62* (2013.01);
(Continued)

(58) Field of Classification Search
CPC .... H04B 1/40; H04B 1/62; H04L 5/14; H04L 5/1461; H04L 5/143; G06F 17/11; G06F 7/483
See application file for complete search history.

(56) References Cited

U.S. PATENT DOCUMENTS 3,922,617 A 11/1975 Denniston et al.
4,321,624 A 3/1982 Gibson et al.
(Continued)

FOREIGN PATENT DOCUMENTS

CN 1204898 1/1999
CN 1901362 1/2007
(Continued)

OTHER PUBLICATIONS

Shenghong Li et al., Full-Duplex Wireless Communication Using Transmitter Output Based Echo Cancellation, IEEE Globecom 2011, Dec. 5, 2011.
(Continued)

*Primary Examiner* — Kenneth Lam
(74) *Attorney, Agent, or Firm* — Jeffrey Schox; Thomas Gwinn

(57) ABSTRACT

A system and method for non-linear digital self-interference cancellation including a pre-processor that generates a first pre-processed digital transmit signal from a digital transmit signal of a full-duplex radio, a non-linear transformer that transforms the first pre-processed digital transmit signal into a non-linear self-interference signal according to a transform configuration, a transform adaptor that sets the transform configuration of the non-linear transformer, and a post-processor that combines the non-linear self-interference signal with a digital receive signal of the full-duplex radio.

20 Claims, 11 Drawing Sheets

Related U.S. Application Data continuation of application No. 14/456,320, filed on Aug. 11, 2014, now Pat. No. 8,976,641.

(60) Provisional application No. 61/864,453, filed on Aug. 9, 2013.

(51) Int. Cl.
*G06F 7/483* (2006.01)
*G06F 17/11* (2006.01)
*H04B 1/62* (2006.01)

(52) U.S. Cl.
CPC ............... *H04L 5/14* (2013.01); *H04L 5/143* (2013.01); *H04L 5/1461* (2013.01)

(56) References Cited

U.S. PATENT DOCUMENTS

| | | |
|---|---|---|
| 4,952,193 A | 8/1990 | Talwar |
| 5,212,827 A | 5/1993 | Meszko et al. |
| 5,691,978 A | 11/1997 | Kenworthy |
| 5,734,967 A | 3/1998 | Kotzin et al. |
| 5,790,658 A | 8/1998 | Yip et al. |
| 5,818,385 A | 10/1998 | Bartholomew |
| 5,930,301 A | 7/1999 | Chester et al. |
| 6,215,812 B1 | 4/2001 | Young et al. |
| 6,240,150 B1 | 5/2001 | Darveau et al. |
| 6,411,250 B1 | 6/2002 | Oswald et al. |
| 6,539,204 B1 | 3/2003 | Marsh et al. |
| 6,567,649 B2 | 5/2003 | Souissi |
| 6,580,771 B2 | 6/2003 | Kenney |
| 6,639,551 B2 | 10/2003 | Li et al. |
| 6,657,950 B1 | 12/2003 | Jones, IV et al. |
| 6,686,879 B2 | 2/2004 | Shattil |
| 6,725,017 B2 | 4/2004 | Blount et al. |
| 6,907,093 B2 | 6/2005 | Blount et al. |
| 6,915,112 B1 | 7/2005 | Sutton et al. |
| 6,965,657 B1 | 11/2005 | Rezvani et al. |
| 6,985,705 B2 | 1/2006 | Shohara |
| 7,057,472 B2 | 6/2006 | Fukamachi et al. |
| 7,139,543 B2 | 11/2006 | Shah |
| 7,177,341 B2 | 2/2007 | McCorkle |
| 7,228,104 B2 | 6/2007 | Collins et al. |
| 7,266,358 B2 | 9/2007 | Hillstrom |
| 7,302,024 B2 | 11/2007 | Arambepola |
| 7,336,128 B2 | 2/2008 | Suzuki et al. |
| 7,336,940 B2 | 2/2008 | Smithson |
| 7,348,844 B2 | 3/2008 | Jaenecke |
| 7,349,505 B2 | 3/2008 | Blount et al. |
| 7,362,257 B2 | 4/2008 | Bruzzone et al. |
| 7,372,420 B1 | 5/2008 | Osterhues et al. |
| 7,397,843 B2 | 7/2008 | Grant et al. |
| 7,426,242 B2 | 9/2008 | Thesling |
| 7,508,898 B2 | 3/2009 | Cyr et al. |
| 7,509,100 B2 | 3/2009 | Toncich |
| 7,706,755 B2 | 4/2010 | Muhammad et al. |
| 7,733,813 B2 | 6/2010 | Shin et al. |
| 7,773,759 B2 | 8/2010 | Alves et al. |
| 7,773,950 B2 | 8/2010 | Wang et al. |
| 7,778,611 B2 | 8/2010 | Asai et al. |
| 7,869,527 B2 | 1/2011 | Vetter et al. |
| 7,948,878 B2 | 5/2011 | Briscoe et al. |
| 7,962,170 B2 | 6/2011 | Axness et al. |
| 7,987,363 B2 | 7/2011 | Chauncey et al. |
| 7,999,715 B2 | 8/2011 | Yamaki et al. |
| 8,005,235 B2 | 8/2011 | Rebandt, II et al. |
| 8,023,438 B2 | 9/2011 | Kangasmaa et al. |
| 8,027,642 B2 | 9/2011 | Proctor, Jr. et al. |
| 8,031,744 B2 | 10/2011 | Radunovic et al. |
| 8,032,183 B2 | 10/2011 | Rudrapatna |
| 8,055,235 B1 | 11/2011 | Gupta et al. |
| 8,060,803 B2 | 11/2011 | Kim |
| 8,081,695 B2 | 12/2011 | Chrabieh et al. |
| 8,085,831 B2 | 12/2011 | Teague |
| 8,086,191 B2 | 12/2011 | Fukuda et al. |
| 8,090,320 B2 | 1/2012 | Dent et al. |
| 8,155,046 B2 | 4/2012 | Jung et al. |
| 8,155,595 B2 | 4/2012 | Sahin et al. |
| 8,160,176 B2 | 4/2012 | Dent et al. |
| 8,175,535 B2 | 5/2012 | Mu |
| 8,179,990 B2 | 5/2012 | Orlik et al. |
| 8,218,697 B2 | 7/2012 | Guess et al. |
| 8,270,456 B2 | 9/2012 | Leach et al. |
| 8,274,342 B2 | 9/2012 | Tsutsumi et al. |
| 8,306,480 B2 | 11/2012 | Muhammad et al. |
| 8,331,477 B2 | 12/2012 | Huang et al. |
| 8,349,933 B2 | 1/2013 | Bhandari et al. |
| 8,351,533 B2 | 1/2013 | Shrivastava et al. |
| 8,385,855 B2 | 2/2013 | Lorg et al. |
| 8,385,871 B2 | 2/2013 | Wyville |
| 8,391,878 B2 | 3/2013 | Tenny |
| 8,417,750 B2 | 4/2013 | Yan et al. |
| 8,422,540 B1 | 4/2013 | Negus et al. |
| 8,428,542 B2 | 4/2013 | Bornazyan |
| 8,446,892 B2 | 5/2013 | Ji et al. |
| 8,457,549 B2 | 6/2013 | Weng et al. |
| 8,462,697 B2 | 6/2013 | Park et al. |
| 8,467,757 B2 | 6/2013 | Ahn |
| 8,498,585 B2 | 7/2013 | Vandenameele |
| 8,502,924 B2 | 8/2013 | Liou et al. |
| 8,509,129 B2 | 8/2013 | Deb et al. |
| 8,521,090 B2 | 8/2013 | Kim et al. |
| 8,576,752 B2 | 11/2013 | Sarca |
| 8,611,401 B2 | 12/2013 | Lakkis |
| 8,619,916 B2 | 12/2013 | Jong |
| 8,625,686 B2 | 1/2014 | Li et al. |
| 8,626,090 B2 | 1/2014 | Dalipi |
| 8,649,417 B2 | 2/2014 | Baldemair et al. |
| 8,711,943 B2 | 4/2014 | Rossato et al. |
| 8,744,377 B2 | 6/2014 | Rimini et al. |
| 8,750,786 B2 | 6/2014 | Larsson et al. |
| 8,755,756 B1 | 6/2014 | Zhang et al. |
| 8,767,869 B2 | 7/2014 | Rimini et al. |
| 8,787,907 B2 | 7/2014 | Jain et al. |
| 8,798,177 B2 | 8/2014 | Park et al. |
| 8,804,975 B2 | 8/2014 | Harris et al. |
| 8,837,332 B2 | 9/2014 | Khojastepour et al. |
| 8,842,584 B2 | 9/2014 | Jana et al. |
| 8,879,433 B2 | 11/2014 | Khojastepour et al. |
| 8,879,811 B2 | 11/2014 | Liu et al. |
| 8,913,528 B2 | 12/2014 | Cheng et al. |
| 8,929,550 B2 | 1/2015 | Shattil et al. |
| 8,995,410 B2 | 3/2015 | Balan et al. |
| 9,014,069 B2 | 4/2015 | Patil et al. |
| 9,019,849 B2 | 4/2015 | Hui et al. |
| 9,031,567 B2 | 5/2015 | Haub |
| 9,042,838 B2 | 5/2015 | Braithwaite |
| 9,054,795 B2 | 6/2015 | Choi et al. |
| 9,065,519 B2 | 6/2015 | Cyzs et al. |
| 9,077,421 B1 | 7/2015 | Mehlman et al. |
| 9,112,476 B2 | 8/2015 | Basaran et al. |
| 9,124,475 B2 | 9/2015 | Li et al. |
| 9,130,747 B2 | 9/2015 | Zinser et al. |
| 9,136,883 B1 | 9/2015 | Moher et al. |
| 9,160,430 B2 | 10/2015 | Maltsev et al. |
| 9,184,902 B2 | 11/2015 | Khojastepour et al. |
| 9,185,711 B2 | 11/2015 | Lin et al. |
| 9,231,647 B2 | 1/2016 | Polydoros et al. |
| 9,231,712 B2 | 1/2016 | Hahn et al. |
| 9,236,996 B2 | 1/2016 | Khandani |
| 9,264,024 B2 | 2/2016 | Shin et al. |
| 9,312,895 B1 | 4/2016 | Gupta et al. |
| 9,325,432 B2 | 4/2016 | Hong et al. |
| 9,331,737 B2 | 5/2016 | Hong et al. |
| 9,413,500 B2 | 8/2016 | Chincholi et al. |
| 9,413,516 B2 | 8/2016 | Khandani |
| 9,461,698 B2 | 10/2016 | Moffatt et al. |
| 9,490,963 B2 | 11/2016 | Choi et al. |
| 9,537,543 B2 | 1/2017 | Choi |
| 9,647,705 B2 | 5/2017 | Pack et al. |
| 9,667,299 B2 * | 5/2017 | Choi ................ H04B 1/40 |
| 9,787,459 B2 * | 10/2017 | Azadet ............ H04L 5/1461 |
| 9,935,757 B2 | 4/2018 | Chung et al. |
| 9,973,224 B2 | 5/2018 | Liu et al. |

(56) References Cited

U.S. PATENT DOCUMENTS

| | | |
|---|---|---|
| 2002/0154717 A1 | 10/2002 | Shima et al. |
| 2003/0031279 A1* | 2/2003 | Blount ................ H04B 1/525 |
| | | 375/346 |
| 2004/0106381 A1 | 6/2004 | Tiller |
| 2005/0250466 A1 | 11/2005 | Varma et al. |
| 2006/0058022 A1 | 3/2006 | Webster et al. |
| 2007/0207747 A1 | 9/2007 | Johnson et al. |
| 2007/0249314 A1 | 10/2007 | Sanders et al. |
| 2008/0131133 A1 | 6/2008 | Blunt et al. |
| 2008/0219377 A1 | 9/2008 | Nisbet |
| 2010/0103900 A1 | 4/2010 | Yeh et al. |
| 2010/0136900 A1 | 6/2010 | Seki |
| 2010/0215124 A1 | 8/2010 | Zeong et al. |
| 2010/0226448 A1 | 9/2010 | Dent |
| 2011/0013684 A1 | 1/2011 | Semenov et al. |
| 2011/0026509 A1 | 2/2011 | Tanaka |
| 2011/0050592 A1* | 3/2011 | Kim ................ G06F 3/0488 |
| | | 345/173 |
| 2011/0256857 A1 | 10/2011 | Chen et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0166259 A1 | 6/2013 | Weber et al. |
| 2013/0253917 A1 | 9/2013 | Schildbach |
| 2013/0301487 A1 | 11/2013 | Khandani |
| 2014/0011461 A1 | 1/2014 | Bakalski et al. |
| 2014/0169236 A1 | 6/2014 | Choi et al. |
| 2014/0313946 A1* | 10/2014 | Azadet ................ G06F 17/5009 |
| | | 370/278 |
| 2014/0348018 A1* | 11/2014 | Bharadia ................ H04L 5/1461 |
| | | 370/252 |
| 2014/0348032 A1 | 11/2014 | Hua et al. |
| 2015/0071062 A1* | 3/2015 | Cheng ................ H04B 7/0689 |
| | | 370/230 |
| 2015/0139122 A1 | 5/2015 | Rimini et al. |
| 2015/0188646 A1 | 7/2015 | Bharadia et al. |
| 2015/0215937 A1 | 7/2015 | Khandani |
| 2015/0270865 A1* | 9/2015 | Polydoros ................ H04B 1/62 |
| | | 375/346 |
| 2015/0303984 A1 | 10/2015 | Braithwaite |
| 2016/0100415 A1* | 4/2016 | Mishra ................ H04L 5/14 |
| | | 370/277 |
| 2016/0218769 A1 | 7/2016 | Chang et al. |
| 2016/0226653 A1* | 8/2016 | Bharadia ................ H04B 1/525 |
| 2017/0041165 A1 | 2/2017 | Cheng et al. |
| 2018/0013466 A1 | 1/2018 | Kim et al. |

FOREIGN PATENT DOCUMENTS

| | | |
|---|---|---|
| EP | 0755141 | 1/1997 |
| EP | 1959625 | 2/2009 |
| EP | 2237434 | 10/2010 |
| EP | 2267946 | 12/2010 |
| RU | 2256985 | 7/2005 |
| WO | 173250 | 11/2013 |
| WO | 185106 | 12/2013 |
| WO | 093916 | 6/2014 |

OTHER PUBLICATIONS

Taneli Riihonen et al., Mitigation of Loopback Self-Interference in Full-Duplex MIMO Relays, IEEE Transactions on Signal Processing, vol. 59, No. 12 Dec. 1, 2011.

Yingbo Hua et al., A Method for Broadband Full-Duplex MIMO Radio, IEEE Signal Processing Letters, vol. 19, No. 12, Dec. 1, 2012.

Bharadia et al., "Full Duplex Radios" SIGOMM, Aug. 12-16, 2013, Hong Kong, China, Copyright 2013 ACM 978-1-4503-2056-6/6/13/08, 12 pages.

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

* cited by examiner digital transmit signal

RF transmit signal (converted from digital transmit signal)

digital transmit signal pre-distorted digital transmit signal

RF transmit signal (converted from pre-distorted digital transmit signal)

SYSTEMS AND METHODS FOR NON-LINEAR DIGITAL SELF-INTERFERENCE CANCELLATION

CROSS-REFERENCE TO RELATED APPLICATIONS

This application is a continuation of U.S. patent application Ser. No. 14/607,571, filed 28 Jan. 2015, which is a continuation of U.S. patent application Ser. No. 14/456,320, filed on 11 Aug. 2014, which claims the benefit of U.S. Provisional Application Ser. No. 61/864,453, filed on 9 Aug. 2013, all of which are incorporated in their entireties by this reference.

TECHNICAL FIELD

This invention relates generally to the wireless communications field, and more specifically to new and useful systems and methods for non-linear digital self-interference cancellation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, solutions intended to address self-interference have failed to successfully address non-linearities resulting from the conversion of a baseband digital signal to a transmitted RF signal (during transmission) and the conversion of a received RF signal back to a baseband digital signal (during reception). Thus, there is a need in the wireless communications field to create new and useful systems and methods for non-linear digital self-interference cancellation. This invention provides such new and useful systems and methods.

DESCRIPTION OF THE PREFERRED EMBODIMENTS

Figure 1:
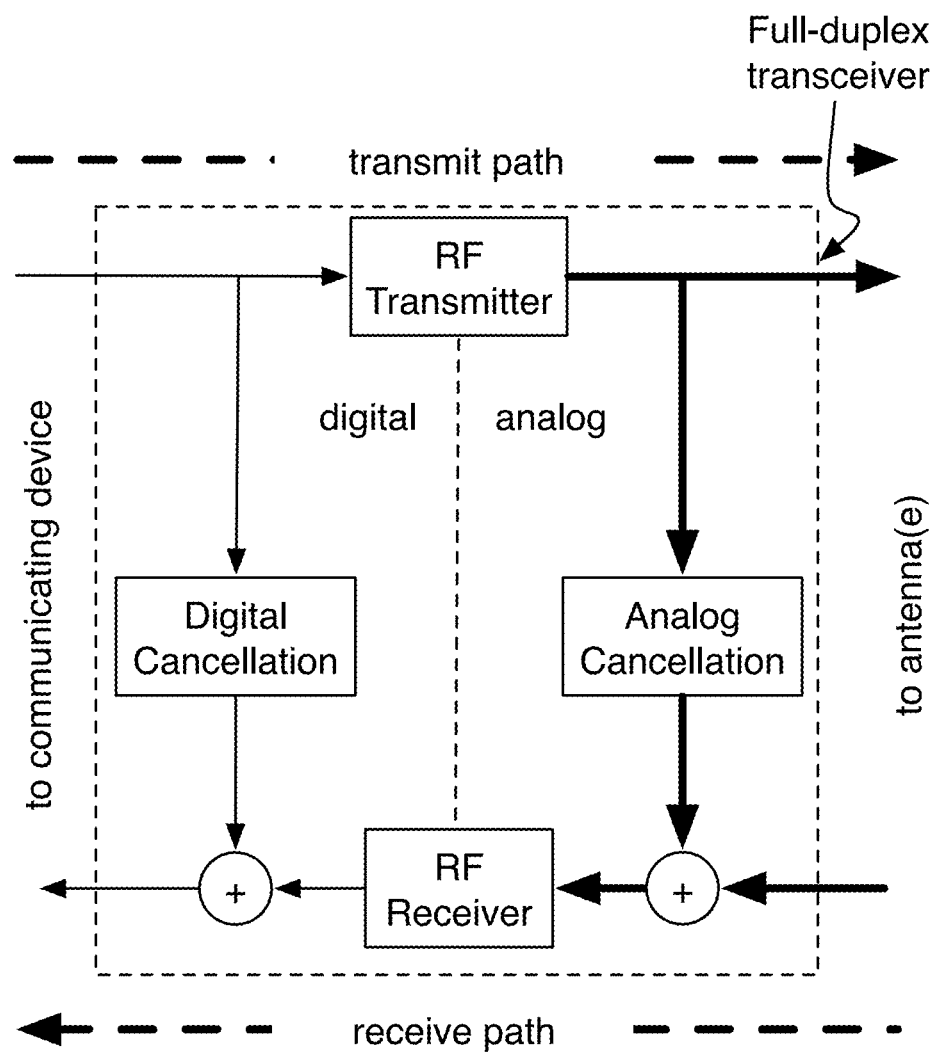
FIG. 1 is a diagram representation of full-duplex radio including digital and analog self-interference cancellation.

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource a scarcer one. As a result, spectral efficiency has become increasingly important to wireless communications systems.

One promising solution for increasing spectral efficiency is found in full-duplex wireless communications systems; that is, wireless communications systems that are able to transmit and receiving wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals or as RF analog signals, but full-duplex transceivers may additionally or alternatively sample transmission output in any suitable manner. This sampled transmission output may be used by full-duplex transceivers to remove interference from received wireless communications data (e.g., as RF analog signals or baseband digital signals). In many full-duplex transceivers, the digital cancellation system functions by imposing a scaled version of the transmitted digital baseband signal on the received baseband signal and the analog cancellation system functions by imposing a scaled version of the transmitted RF analog signal on the received RF analog signal. This architecture is generally effective for reducing interference when transceiver components are operating in a linear regime, but fails to account for signal non-linearities arising from the conversion of data to transmitted RF signal and vice-versa. These non-linearities may become more pronounced as transmitter/receiver power are increased; as a result, a full-duplex transceiver without effective non-linear interference cancellation may be limited in power range by performance issues.

The systems and methods described herein increase the performance of full-duplex transceivers as shown in FIG. 1 (and other applicable systems) by providing for non-linear digital self-interference cancellation. Other applicable systems include active sensing systems (e.g., RADAR), wired communications systems, wireless communications systems, and/or any other suitable system, including communications systems where transmit and receive bands are close in frequency, but not overlapping.

2. System for Non-Linear Digital Self-Interference Cancellation

Figure 2:
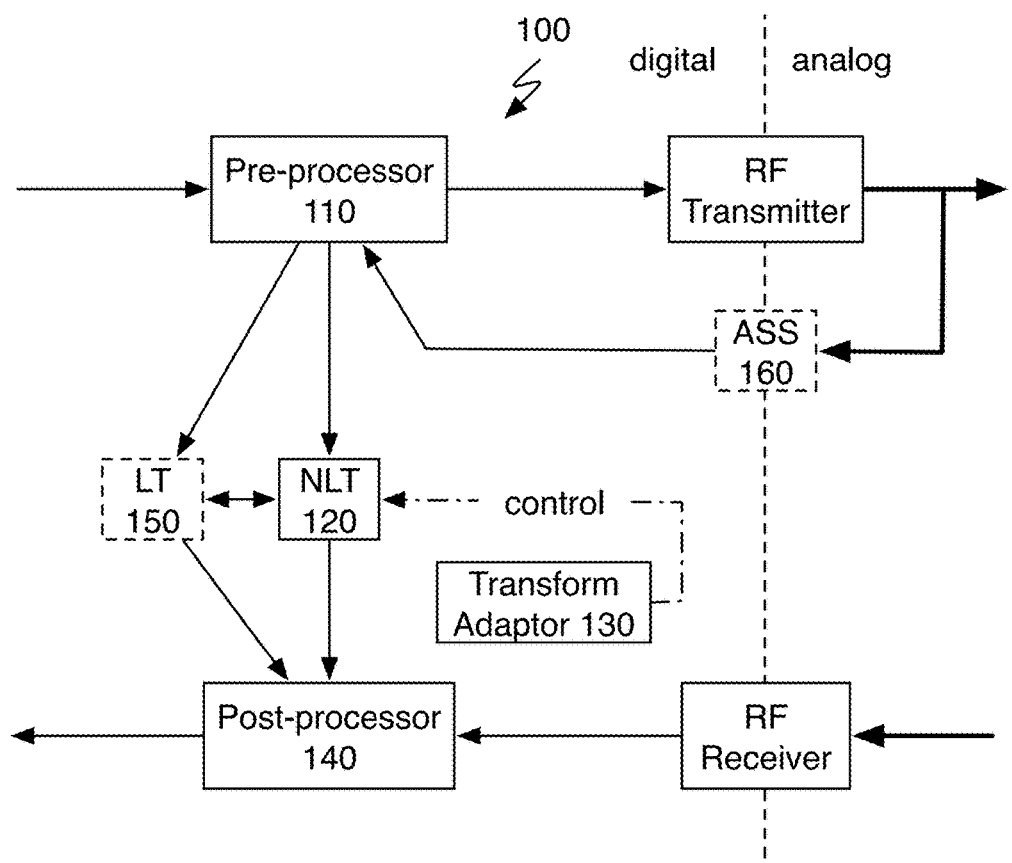
FIG. 2 is a diagram representation of a system of a preferred embodiment.

As shown in FIG. 2, a system 100 for non-linear digital self-interference cancellation includes a pre-processor 110, a non-linear transformer 120, a transform adaptor 130, and a post-processor 140. The system 100 may additionally or alternatively include a linear transformer 150 and/or an analog signal sampler 160.

The system 100 functions to reduce self-interference in full-duplex wireless communications systems by canceling non-linear components of self-interference present in digital signals resulting from received RF transmissions. Non-linear digital self-interference cancellation may improve the performance of full-duplex wireless communications systems in numerous operating modes; particularly in operating modes where components of the full-duplex wireless communications systems are operating in substantially non-linear regimes (e.g. operating modes designed to maximize transmission power, power efficiency, etc.). The system 100 reduces non-linear digital self-interference by passing a digital transmit signal through the pre-processor 110, which samples digital transmit signals in the transmission path and passes the sampled digital transmit signals to the non-linear transformer 120. The non-linear transformer 120 generates a non-linear self-interference cancellation signal based on the input transmit signal and a transform configuration set by the transform adaptor 130. The non-linear cancellation signal is then combined with the digital receive signal originating from an RF receiver by the post-processor 140 to remove self-interference in the digital receive signal. If the system 100 includes a linear transformer 150, the linear transformer 150 preferably operates in parallel with the non-linear transformer 120 to remove both linear and non-linear components of self interference in the digital receive signal. If the system 100 includes an analog signal sampler 160, the output of the analog signal sampler 160 (e.g., a sample of the RF transmit signal passed through an ADC of the analog signal sampler 160) may be used as input to the non-linear transformer 120 and/or to tune the non-linear transformer 120 (preferably through the transform adaptor 130).

The system 100 may be implemented using a general purpose processor, a digital signal processor, an application specific integrated circuit (ASIC), a field programmable gate array (FPGA) and/or any suitable processor(s) or circuit(s). The system 100 preferably includes memory to store configuration data, but may additionally or alternatively be configured using externally stored configuration data or in any suitable manner.

The system 100 is preferably implemented using a full-duplex radio. Additionally or alternatively, the system 100 may be implemented as active sensing systems (e.g., RADAR), wired communications systems, wireless communications systems, and/or any other suitable system, including communications systems where transmit and receive bands are close in frequency, but not overlapping.

Figure 3:
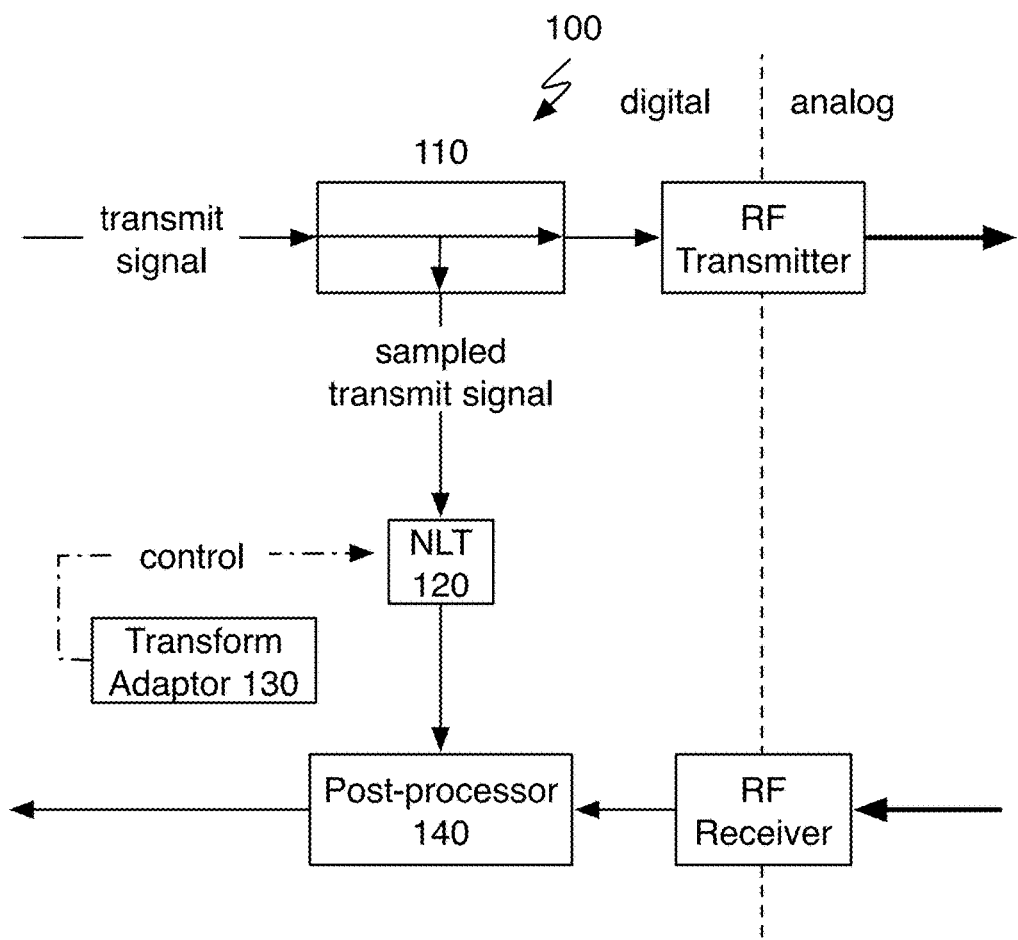
FIG. 3 is a diagram representation of a system of a preferred embodiment.

The pre-processor 110 functions to sample digital transmit signals for further processing by the non-linear transformer 120, as shown in FIG. 3. Digital transmit signals sampled by the pre-processor 110 preferably include digital signals originating from an electronic device, destined for an RF transmitter of a full-duplex radio (or other full-duplex wireless communications system). Digital transmit signals sampled by the pre-processor 110 may additionally or alternatively include digital transmit signals from the analog signal sampler 160 or from any other suitable source.

Digital transmit signals sampled by the pre-processor 110 are preferably encoded for conversion to an analog signal by an RF transmitter, (e.g., encoded via PSK, QAM, OFDM, etc.) but may additionally or alternatively be encoded in any suitable way.

The pre-processor 110 preferably samples digital transmit signals corresponding to a native sampling rate; that is, the pre-processor 110 preferably passes all digital transmit data to the non-linear transformer 120. Additionally or alternatively, the pre-processor 110 may sample a subset of digital transmit signal data; for instance, if a digital transmit signal has a native sample rate of 40 MHz, the pre-processor 110 might discard every other sample before passing to the non-linear transformer 120, corresponding to a sample rate of 20 MHz (while the RF transmitter may still receiver all samples, corresponding to a sample rate of 40 MHz). The pre-processor 110 may additionally or alternatively interpolate digital transmit signals to increase or decrease sampling rate. In one instance, the pre-processor 110 modifies the sampling rate of a digital transmit signal to match a sampling rate of an RF receiver of a full-duplex radio.

In sampling the digital transmit data, the pre-processor 110 may perform pre-processing to prepare sampled digital transmit signals for processing by the non-linear transformer 120. The pre-processor 110 may include various operators for pre-processing such as scaling, shifting, and/or otherwise modifying the digital transmit signals.

In one implementation, the pre-processor 110 modifies sampled digital transmit signals by removing information unlikely to substantially affect the output of the non-linear transformer 120. This may include, for instance, dropping samples if the samples do not represent a change above some change threshold from previous samples. As another example, if digital transmit signals correspond to a particular amplitude of an output analog signal, only digital signal data corresponding to an amplitude above some amplitude threshold may be passed to the non-linear transformer 120.

If the pre-processor 110 receives digital transmit signals from more than one source (e.g. from both the transmit line before the RF transmitter and the analog signal sampler 160, the pre-processor 110 may additionally or alternatively combine the signals in any suitable way or may select one signal over another. For instance, the pre-processor 110 may pass the average of the two signals to the non-linear transformer 120. As another example, the pre-processor 110 may prefer the analog signal sampler originating digital transmit signal over the transmit-path digital transmit signal above a certain transmitter power, and vice versa at or below that transmitter power. The selection and combination of the two signals may be dependent on any suitable condition.

If the pre-processor 110 passes sampled digital transmit signals to more than one input (e.g. to both a non-linear transformer 120 and a linear transformer 150), the pre-processor 110 may provide different versions of the sampled digital transmit signals to the different inputs. As a first example, the pre-processor 110 may pass identical signals to both a non-linear transformer 120 and a linear transformer 150. As a second example, the pre-processor 110 may pass every fourth sample of a digital signal to the non-linear transformer 120 and every sample of a digital signal to the linear transformer 150 (this might be useful if the non-linear distortions of the signal change more slowly than the linear distortions). As a third example, the pre-processor 110 may split the sampled digital signal into "linear" and "non-linear" components, where "linear" and "non-linear" components correspond to components of the digital signal more likely to have an effect on linear distortions in received self-interference and non-linear distortions in received self-interference respectively.

The non-linear transformer 120 functions to transform sampled digital transmit signals into non-linear self-interference signals; that is, signals that represent a hypothesized contribution of non-linear self-interference to a received digital signal. Non-linear self-interference contributions may result from a variety of sources, including components in both RF receivers and RF transmitters of full-duplex radios (e.g., mixers, power amplifiers, ADCs, DACs, etc.). Further, non-linear self-interference contributions may vary randomly, or with environmental or input conditions (e.g. transmission power, ambient temperature, etc.).

The non-linear transformer 120 preferably transforms sampled digital transmit signals through the use of mathematical models adapted to model non-linear self-interference contributions of the RF transmitter, RF receiver, and/or other sources. Examples of mathematical models that may be used by the non-linear transformer 120 include generalized memory polynomial (GMP) models, Volterra models, and Wiener-Hammerstein models; the non-linear transformer 120 may additionally or alternatively use any combination or set of models.

The non-linear transformer 120 may additionally or alternatively generate mathematical models for modeling non-linear self-interference contributions based on comparisons of sampled digital transmit signals to received signals (from the analog signal sampler 150, the receive path, or any other suitable source). These models may be generated from previously known models or may be created using neural network and/or machine learning techniques.

Many mathematical models suitable for use in the non-linear transformer 120 (including GMP models) model non-linear self-interference contributions as a sum or product of signals having different order; for example, a general form of a GMP is as follows:

$$\sum_k c_{nk} x[n] |x[n]|^{k-1} +$$

$$\sum_k c_{nk} x[n] |x[n-m-l]|^{k-1} + \sum_k c_{nk} x[n] |x[n-m+l]|^{k-1}$$

where the input signal is represented by $x[n]$ and $c_{nk}$ represents coefficients of the GMP. The first sum of the GMP captures non-linear self-interference effects occurring based on current values of the input signal, while the second two terms capture non-linear self-interference effects determined by past values of the input signal (known as memory effects).

For these mathematical models, the bandwidth of terms of order k are generally k times larger than the bandwidth of the input signal; for example, if an input signal $x[n]$ has a bandwidth of 40 MHz, the third order terms (e.g., $x[n]|x[n-m]|^2$) will occupy a bandwidth of 120 MHz. To avoid issues arising from aliasing, the input signal is preferably sampled at a sampling rate of 120 MHz (three times more than an initial Nyquist sampling rate of 40 MHz). As the number of terms increase, so does the ability to model non-linear self-interference effects, but so also does the minimum sampling rate to avoid aliasing. This presents another issue; the RF transmitter may also have to match this increased sampling rate in order to subtract non-linear digital interference signals from received signals. For example, if a GMP model uses $7^{th}$ order terms, for the same 40 MHz transmit signal the RF receiver may have to sample the received signal at a rate of 280 MHz to avoid aliasing issues (and likewise, the transmit signal may have to be sampled at the same rate).

Figure 4:
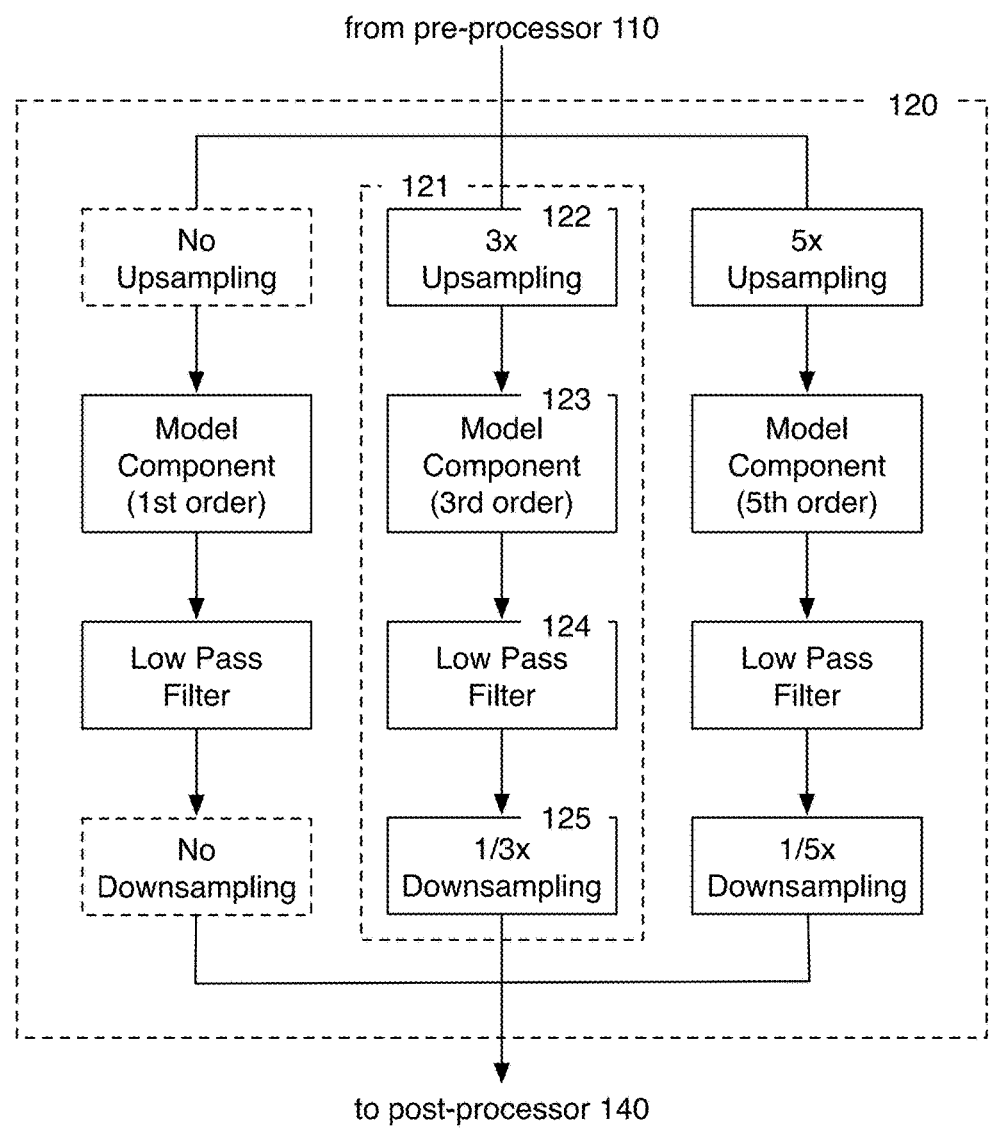
FIG. 4 is a diagram representation of a non-linear transformer of a system of a preferred embodiment.

In one embodiment of the invention, the non-linear transformer 120 addresses these issues by separating the model used to generate non-linear interference signals into components, each components corresponding to an output order (e.g., one component containing $x[n]$ terms, another component containing $x[n]|x[n-m]|^2$ terms). The preferred result of this separation is that the sampling rate necessary for each model component to avoid aliasing is known as a function of component signal order. In this embodiment, the non-linear transformer includes a number of transform paths 121, each of which may include an upsampler 122, a model component 123, a filter 124, and a downsampler 125, as shown in FIG. 4. Each transform path 121 corresponds to a model component 123 of a particular integer order; when a digital transmit signal is passed to a transform path 121, the transform path 121 first upsamples the digital transmit signal by passing it to the upsampler 122.

The upsampler 122 functions to increase the number of samples contained within the digital transmit signal in order to reduce aliasing effects. Note that for the first order term of the model, upsampling may not be necessary. The upsampler 122 preferably increases the number of samples contained within a digital transmit signal according to linear interpolation, but may additionally or alternatively use any suitable method. In one example, the upsampler 122 upsamples the digital transmit signal by creating a sequence comprising the original samples separated by L−1 zeroes (where L the upsampling factor) and then passing the new signal through a finite impulse response (FIR) lowpass filter. In another example, the upsampler 122 creates a sequence comprising the original samples separated from each other by L−1 new samples, where each new sample is modeled on how a DAC converts digital samples to an analog signal (e.g. if the output of the DAC is not exactly linear between outputs). For a transmit path 121 (and model component 123) of integer order k, the upsampler 122 preferably upsamples the digital transmit signal with an upsampling factor of k, but may additionally or alternatively upsample the digital transmit signal by any suitable factor.

The model component 123 represents the part of the model producing an output of a particular signal order; for instance, a model component 123 of order 3 corresponding to a GMP model might be represented as $$c_{n3}x[n]|x[n]|^2 + c_{n3}x[n]|x[n-m]|^2$$

The model component 123 preferably includes model terms of a single order only, but may additionally or alternatively include model terms of more than one order. The model component 123 preferably comprises a set of expressions from a generalized memory polynomial (GMP) model, Volterra model, Wiener-Hammerstein model, or neural network model, but may additionally or alternatively comprise a part or whole of any suitable model or combination of models.

The model component 123 preferably takes the correspondingly upsampled digital transmit signal as input and outputs a non-linear interference signal component.

The filter 124 functions to reduce the bandwidth of non-linear interference signal components to prepare the non-linear interference signal components for combination with digital signals received from the RF receiver (or other suitable source). The filter 124 is preferably a digitally implemented FIR lowpass filter, but may additionally or alternatively be any suitable type of filter (e.g., infinite impulse response (IIR) filters, Fourier-transform based filters). The filter 124 preferably reduces the bandwidth of non-linear interference signal components to match the bandwidth of the digital baseband signal received from the RF transmitter, but may additionally or alternatively function to cap the bandwidth of non-linear interference signal components at any value below the maximum bandwidth of all non-linear interference signal components produced by model components 123. The filter 124 preferably functions both to prepare the non-linear interference signal components for downsampling and to remove non-linear interference signal components not found in the received baseband signal (e.g., if the RF receiver has a corresponding lowpass filter for the baseband analog or digital signals or potentially a corresponding bandpass filter for the RF signal).

The downsampler 125 functions to reduce the number of samples contained within a non-linear interference signal component generated by a model component 123 (and preferably filtered by a filter 124). The downsampler 125 preferably downsamples non-linear interference signal components by simply removing signals at a particular interval (e.g., throwing away every other sample to halve the number of samples) but may additionally or alternatively downsample non-linear interference signal components by any suitable method. The downsampler 125 preferably downsamples non-linear interference signal components to match the sampling rate of the received digital baseband signal, but may additionally or alternatively downsample non-linear interference signal components to any suitable sampling rate.

The non-linear interference signal components are preferably combined by the non-linear transformer 120 before being sent to the post-processor 140; additionally or alternatively, the non-linear transformer 120 may pass the non-linear interference signal components to the post-processor 140 without combining them. The non-linear transformer 120 preferably combines non-linear interference signal components by adding them, but may additionally or alternatively combine them in any suitable way (e.g. scaling components before adding them and/or combining components multiplicatively).

The transform adaptor 130 functions to set the transform configuration of the non-linear transformer 120. The transform adaptor 130 may additionally set the transform configuration of the linear transformer 150 if present; the details below discussing the transform configuration of the non-linear transformer 120 are preferably also applicable to the transform configuration of the linear transformer 150 unless otherwise stated.

The transform configuration preferably includes the type of model or models used by the non-linear transformer 120 as well as configuration details pertaining to the models (each individual model is a model type paired with a particular set of configuration details). For example, one transform configuration might set the non-linear transformer 120 to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the non-linear transformer 120. For example, if the non-linear transformer 120 includes multiple transform paths 121, the transform adaptor 130 may set the number of these transform paths 121, which model order their respective model components 123 correspond to, the type of filtering used by the filter 124, and/or any other suitable details. In general, the transform configuration may include any details relating to the computation or structure of the non-linear transformer 120.

Transform configurations are preferably selected and/or generated by the transform adaptor 130. The transform adaptor 130 may set an appropriate transform configuration by selecting from stored static configurations, from generating configurations dynamically, or by any other suitable manner or combination of manners. For example, the transform adaptor 130 may choose from three static transform configurations based on their applicability to particular signal and/or environmental conditions (the first is appropriate for low transmitter power, the second for medium transmitter power, and the third for high transmitter power). As another example, the transform adaptor 130 may dynamically generate configurations based on signal and/or environmental conditions; the coefficients of a GMP model are set by a formula that takes transmitter power, temperature, and receiver power as input.

The transform adaptor 130 preferably sets transform configurations based on a variety of input data (whether transform configurations are selected from a set of static configurations or generated according to a formula or model). Input data used by the transform adaptor 130 may include static environmental and system data (e.g. receiver operating characteristics, transmitter operating characteristics, receiver elevation above sea-level), dynamic environmental and system data (e.g. current ambient temperature, current receiver temperature, average transmitter power, ambient humidity), and/or system configuration data (e.g. receiver/transmitter settings), signal data (e.g., digital transmit signal, RF transmit signal, RF receive signal, digital receive signal). If the system 100 uses an analog signal sampler 160, the transform adaptor 130 may additionally or alternatively use output of the analog signal sampler 160 as input for setting transform configurations. The transform adaptor 130 may additionally or alternatively generate and/or use models based on this input data to set transform configurations; for example, a transmitter manufacturer may give a model to predict internal temperature of the transmitter based on transmitter power, and the transform adaptor 130 may use the output of this model (given transmitter power) as input data for setting transform configurations.

The transform adaptor 130 may set transform configurations at any time, but preferably sets transform configurations in response to either a time threshold or other input data threshold being crossed. For example, the transform adaptor 130 may re-set transform configurations every ten seconds according to changed input data values. As another example, the transform adaptor 130 may re-set transform configurations whenever transmitter power thresholds are crossed (e.g. whenever transmitter power increases by ten percent since the last transform configuration setting, or whenever transmitter power increases over some static value).

If the system 100 is connected to a full-duplex wireless communications system also having an analog canceller, the transform adaptor 130 may cooperate with the analog canceller (for instance, setting transform configurations based on data from the analog canceller, or coordinating transform configuration setting times with the analog canceller) to reduce overall self-interference (or for any other suitable reason).

The transform adapter 130 preferably adapts transform configurations and/or transform-configuration-generating algorithms (i.e., algorithms that dynamically generate transform configurations) to reduce self-interference for a given transmit signal and set of system/environmental conditions. The transform adapter 130 may adapt transform configurations and/or transform-configuration-generating algorithms using analytical methods, online gradient-descent methods (e.g., LMS, RLMS), and/or any other suitable methods. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

The transform adaptor 130 may adapt transform configurations based on test input scenarios (e.g. scenarios when the signal received by the RF receiver is known), scenarios where there is no input (e.g. the only signal received at the RF receiver is the signal transmitted by the RF transmitter), or scenarios where the received signal is unknown. In cases where the received signal is an unknown signal, the transform adaptor 130 may adapt transform configurations based on historical received data (e.g. what the signal looked like ten seconds ago) or any other suitable information. The transform adaptor 130 may additionally or alternatively adapt transform configurations based on the content of the transmitted signal; for instance, if the transmitted signal is modulated in a particular way, the transform adaptor 130 may look for that same modulation in the self-interference signal; more specifically, the transform adaptor 130 may adapt transform configurations such that when the self-interference signal is combined with the digital receive signal the remaining modulation (as an indicator of self-interference) is reduced (compared to a previous transform configuration).

Figure 5:
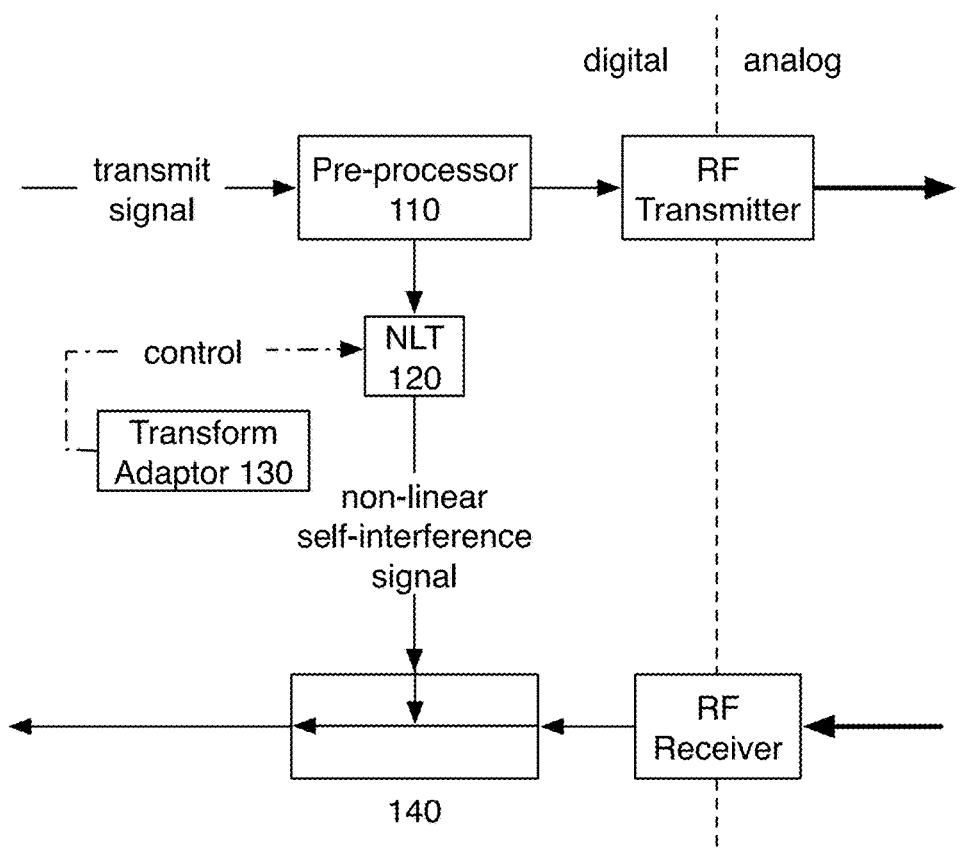
FIG. 5 is a diagram representation of a system of a preferred embodiment.

The post-processor 140 functions to combine non-linear self interference signals generated by the non-linear transformer 120 with digital signals received by the RF receiver, as shown in FIG. 5. The post-processor 140 preferably combines non-linear self-interference signals from the non-linear transformer 120 with digital receive signals from an RF receiver of a full-duplex wireless communications system. Additionally or alternatively, the post-processor 140 may combine linear self-interference signals from the linear transformer 150 with digital receive signals from an RF receiver of a full-duplex wireless communications system. The post-processor 140 may additionally or alternatively combine linear or non-linear self-interference signals with any suitable digital receive signal. Digital receive signals entering the post-processor 140 are preferably encoded for conversion to an analog signal by an RF transmitter, (e.g., encoded via PSK, QAM, OFDM, etc.) but may additionally or alternatively be encoded in any suitable way.

The post-processor 140 may perform post-processing to prepare self-interference signals for combination with digital receive signals; this may include scaling, shifting, filtering, and/or otherwise modifying the self-interference signals. For example, the post-processor 140 may include a lowpass filter designed to filter out high-frequency components of generated self-interference signals (e.g., to match a corresponding bandwidth of the RF transmitter). If the system 100 includes a linear transformer 150, the post-processor may combine the output of the linear transformer 150 and the non-linear transformer 120 before combining the (potentially weighted) combination of the two signals with digital receive signals. The post-processor 140 preferably matches the sampling rate of self-interference signals output by the non-linear transformer 120 and the linear transformer 150 with the sampling rate of the output of the RF receiver through upsampling and/or downsampling as previously described, but may additionally or alternatively not alter the sampling rate of self-interference signals or set the sampling rate of self-interference signals to a sampling rate other than that of RF receiver output.

The post-processor 140 may combine output from the non-linear transformer 120 and the linear transformer 150 (if present) in any suitable way, including combining non-linear or linear self-interference signal components. For example, the post-processor 140 may combine output from the non-linear transformer 120 and the linear transformer 150 as a weighted sum. As another example, the post-processor 140 may select output from one of the two transformers (or may select subsets of output from either or both; e.g., two of five non-linear self-interference signal components). If the pre-processor 110 splits digital transmit signals between the linear transformer 150 and the non-linear transformer 120, the post-processor 140 may rejoin said digital signals based on the split (e.g. by performing a joining operation that is an approximate inverse of the splitting operation).

Figure 6:
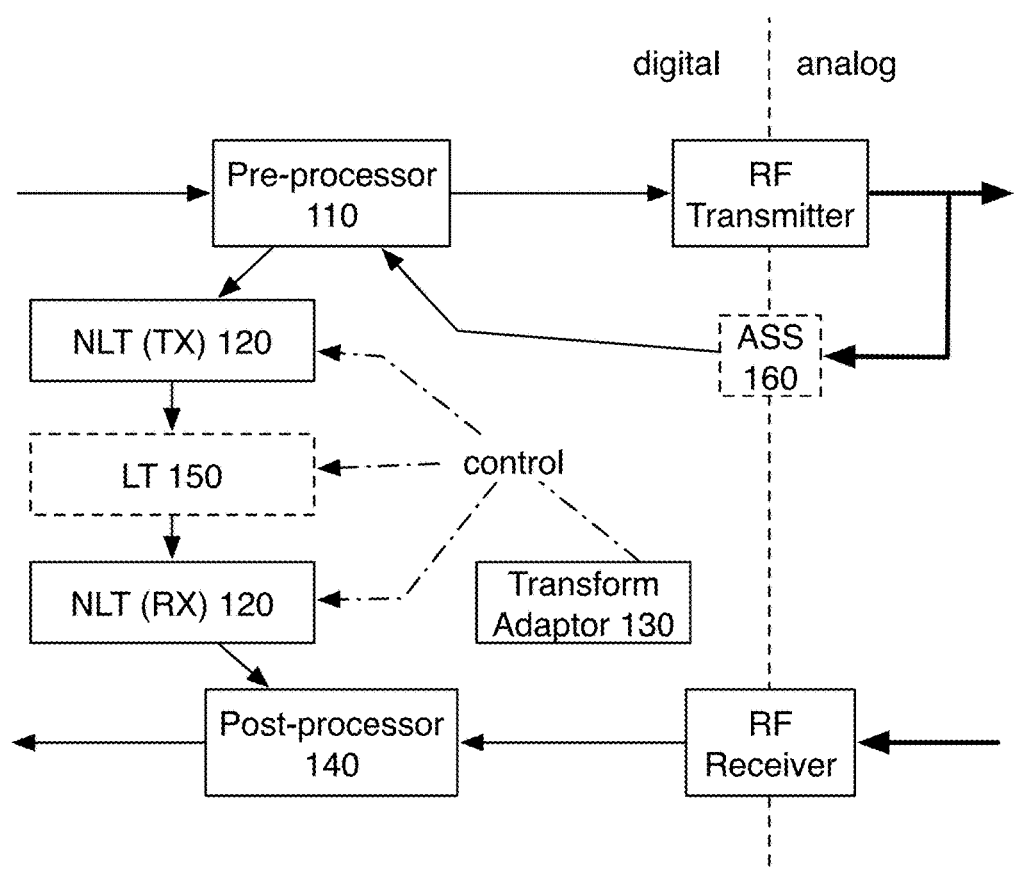
FIG. 6 is a diagram representation of a system of a preferred embodiment.

The linear transformer 150 functions to transform sampled digital transmit signals into linear self-interference signals; that is, signals that represent a hypothesized contribution of linear self-interference to a received digital signal. Like with non-linear self-interference, linear self-interference contributions may result from a variety of sources. Non-linearity often stems from non-linear behavior of typical wireless transmitter components, while the actual wireless channel may often be very linear in response. While it is possible to model the entire self-interference signal with a larger non-linear model, it is often advantageous for performance reasons to use a hybrid model where the transmitter (and potentially receiver) non-linearities are accounted for by a smaller non-linear model and the wireless channel response is accounted for by a linear model (in the system 100, these models could be implemented in the non-linear transformer 120 and the linear transformer 150 respectively). Splitting the models in this way may allow for a significant reduction in the number of calculations performed to generate a self-interference signal. Additionally, while non-linearities in a transmitter or receiver may be relatively stable over time (e.g., changing over periods of minutes or hours), linear self-interference effects present in the wireless channel may change very rapidly (e.g. over periods of milliseconds). Using split models allows for the simpler linear self-interference model to be tuned and adjusted at a fast rate without having to also tune and adjust the more computationally complex non-linear self-interference model. This concept may be extended to having separate non-linear models for the transmitter and receiver, as shown in FIG. 6.

The linear transformer 150 preferably transforms sampled digital transmit signals through the use of mathematical models adapted to model linear self-interference contributions of the RF transmitter, RF receiver, the wireless channel, and/or other sources. Examples of mathematical models that may be used by the linear transformer 150 include generalized memory polynomial (GMP) models, Volterra models, and Wiener-Hammerstein models; the non-linear transformer 120 may additionally or alternatively use any combination or set of models.

The linear transformer 150 may additionally or alternatively generate mathematical models for modeling linear self-interference contributions based on comparisons of sampled digital transmit signals to received signals (from the analog signal sampler 150, the receive path, or any other suitable source). These models may be generated from previously known models or may be created using neural network and/or machine learning techniques.

The analog signal sampler 160 functions to provide a digital signal converted from the RF transmit signal (and/or a baseband or intermediate frequency analog signal) to the system 100. This digital signal differs from the digital transmit signal in that it may contain non-linearities resulting from the conversion of the digital transmit signal to an RF transmit signal (and/or baseband or intermediate frequency analog transmit signal) and back again, but also differs from the RF receive signal in that it results from a different signal path (e.g., the analog signal is sampled before reaching the antenna). Thus, the analog signal sampler 160 may be used to provide information to the non-linear transformer 120, linear transformer 150, and/or transform adaptor 130 that the digital transmit signal may not contain. The analog signal sampler 160 output is preferably directed to appropriate sources by the pre-processor 110, but the analog signal sampler 160 may additionally or alternatively output to any suitable part of the system 100 (including the non-linear transformer 120 and/or the transform adaptor 130).

Figure 7:
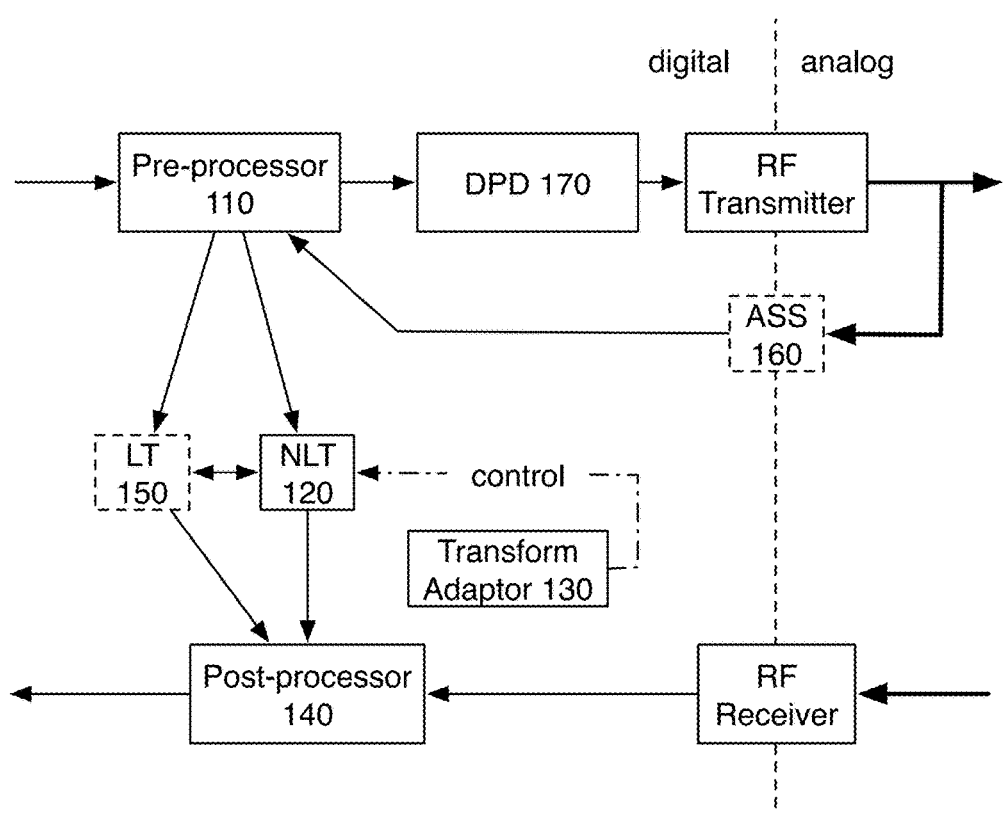
FIG. 7 is a diagram representation of a system of a preferred embodiment.
Figure 8A:
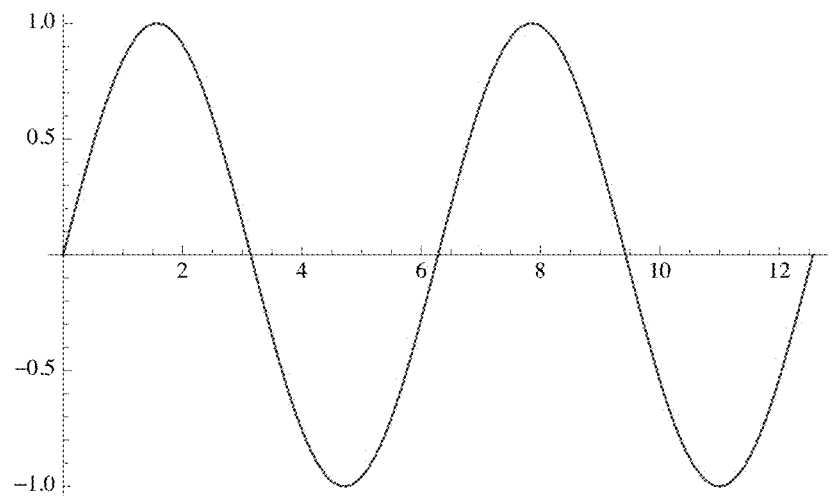
FIG. 8A is an example signal representation of non-linear distortion in a transmit signal.
Figure 8A:
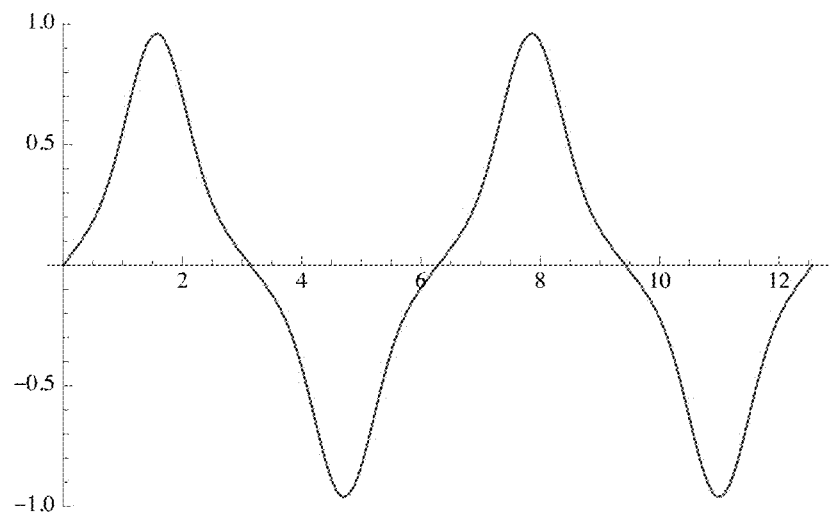
Figure 8B:
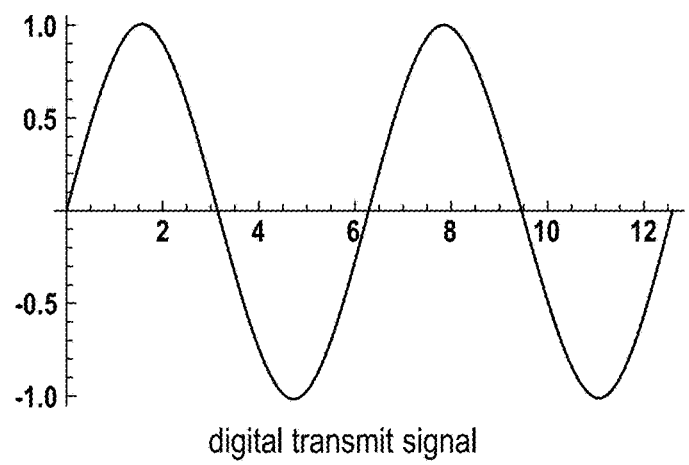
FIG. 8B is an example signal representation of pre-distortion in a transmit signal.
Figure 8B:
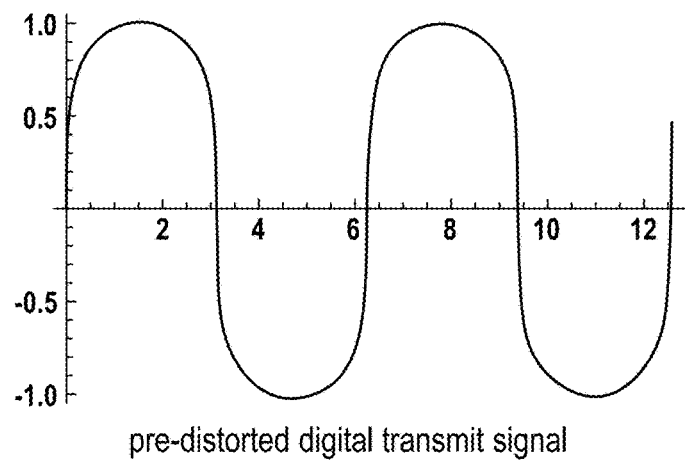
Figure 8B:
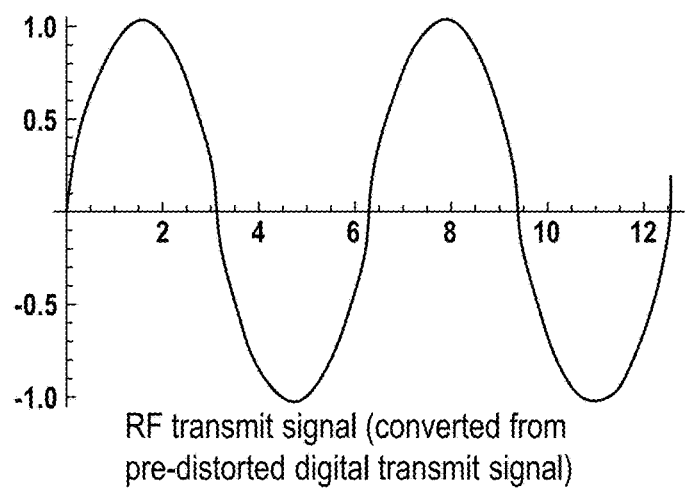

In one variation of a preferred embodiment, the system 100 includes a digital pre-distortion circuit (DPD) 170, as shown in FIG. 7. Because a large portion of non-linearities in full-duplex wireless communications systems arise from components of the RF transmitter, and these non-linearities may contribute to reduced power efficiency of the RF transmitter, it may be advantageous (both from the perspective of increasing transmitter efficiency and for reducing the amount of non-linear self-interference cancellation needed) to reduce the non-linear components of the RF transmit signal. An example of non-linear distortion occurring when converting a digital transmit signal to an RF transmit signal is as shown in FIG. 8A. One way to do this involves pre-distorting the digital transmit signal such that the distortions in the digital transmit signal serve to correct distortions introduced by the RF transmitter in converting the digital transmit signal to an RF transmit signal, as shown in FIG. 8B.

The DPD 170 preferably takes samples (which may be digital or analog) from the output of the RF transmitter to measure the non-linearity inherent in the RF transmitter output. The DPD 170 preferably receives samples from the analog signal sampler 160 but may additionally or alternatively receive them from any suitable source. Based on the RF transmitter output samples, the DPD 170 transforms the digital transmit signal to create 'inverse' non-linearity in the signal (as shown in FIG. 8B). This 'inverse' non-linearity, when further transformed by the RF transmitter (in the process of converting the digital transmit signal to an RF transmit signal) reduces the non-linearity present in the final RF transmit signal.

Pre-distortion (or other linearization techniques) provided by the DPD 170 or other suitable sources may be leveraged to reduce the complexity of digital self-interference cancellation. By placing the DPD 170 after the pre-processor 110 in the digital transmit signal path (as shown in FIG. 7), non-linearity in the receive signal path is reduced, and additionally, the non-linear transformer 120 does not need to transform the digital transmit signal to remove non-linearities introduced by the DPD 170 (as it may need to if the DPD 170 occurred before the pre-processor 110 in the digital transmit signal path).

2. Method for Non-Linear Digital Self-Interference Cancellation

Figure 9:
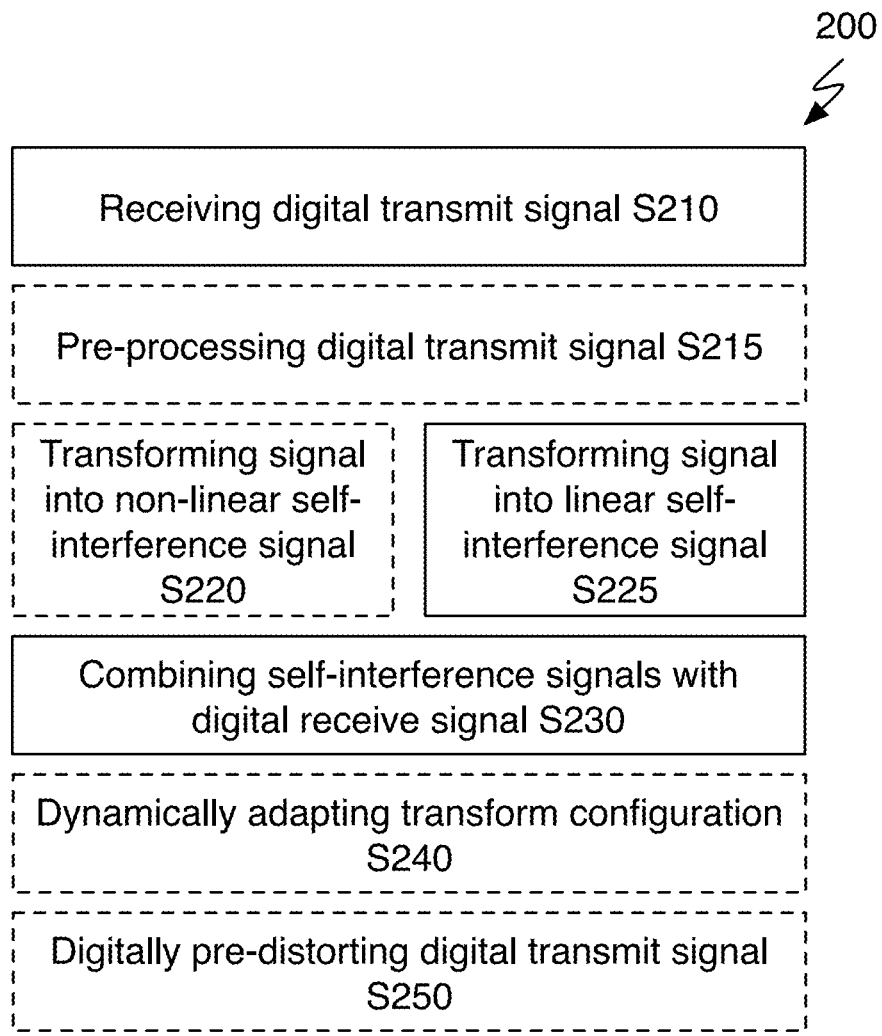
FIG. 9 is a flowchart representation of a method of a preferred embodiment.

As shown in FIG. 9, a method 200 for non-linear digital self-interference cancellation includes receiving a digital transmit signal S210, transforming the digital transmit signal into a non-linear self-interference signal according to a transform configuration S220, and combining the non-linear self-interference signal with a digital receive signal S230. The method 200 may additionally include pre-processing the digital transmit signal S215, transforming the digital transmit signal into a linear self-interference signal S225, dynamically adapting the transform configuration S240, and/or digitally pre-distorting the digital transmit signal S250.

The method 200 functions to reduce self-interference in full-duplex wireless communications systems by canceling non-linear components of self-interference present in digital signals resulting from received RF transmissions. Non-linear digital self-interference cancellation may improve the performance of full-duplex wireless communications systems in numerous operating modes; particularly in operating modes where components of the full-duplex wireless communications systems are operating in substantially non-linear regimes (e.g. operating modes designed to maximize transmission power, power efficiency, etc.). The method 200 reduces non-linear digital self-interference in full-duplex wireless communications systems by sampling a digital transmit signal (Step S210). The received digital transmit signal may be pre-processed (potentially into linear and non-linear components) during Step S215, after which point the digital transmit signal may be transformed into a non-linear self-interference signal according to a transform configuration (Step S220) and optionally also into a linear self-interference signal (Step S225). The self-interference signals are then combined with a digital receive signal of the full-duplex wireless communication system (Step S230) in order to reduce self-interference signals present in the signal received by the wireless communication system. The method 200 may also include adapting the transform configuration dynamically (Step S240) in order to increase the effectiveness of self-interference reduction due to non-linear self-interference transformation and/or digitally pre-distorting the digital transmit signal before the transmitter of the wireless communication signal (Step S250) in order to reduce the amount of non-linear self-interference present in received digital transmit signals (which may reduce computational power required for computations in Steps S220, S225, and/or S240).

The method 200 is preferably implemented by the system 100, but may additionally or alternatively be implemented by any suitable system for non-linear digital self-interference cancellation used with full-duplex wireless communications systems. Additionally or alternatively, the method 200 may be implemented using active sensing systems (e.g., RADAR), wired communications systems, wireless communications systems, and/or any other suitable system, including communications systems where transmit and receive bands are close in frequency, but not overlapping.

Step S210 includes receiving a digital transmit signal. Step S210 functions to provide a digital signal intended for transmission by a full-duplex wireless communications system so that the signal may be used to remove self-interference at the full-duplex wireless communications system receiver. Digital transmit signals received in S210 preferably include digital signals originating from an electronic device, destined for an RF transmitter of a full-duplex radio (or other full-duplex wireless communications system). Digital transmit signals received in S210 may additionally or alternatively include digital transmit signals converted from analog transmit signals (e.g., the RF transmission signal of the RF transmitter of a full-duplex radio) or from any other suitable source. Digital transmit signals received in S210 are preferably encoded for conversion to an analog signal by an RF transmitter, (e.g., encoded via PSK, QAM, OFDM, etc.) but may additionally or alternatively be encoded in any suitable way.

Step S215 includes pre-processing the digital transmit signal. Step S215 functions to perform initial processing on the digital transmit signal received in S210 (if desired). Step S215 preferably includes pre-processing all data received in S210; additionally or alternatively, S215 may include sampling a subset of digital transmit signal data; for instance, if a digital transmit signal has a native sample rate of 40 MHz, S215 might include discarding every other sample as part of pre-processing, corresponding to a sample rate of 20 MHz. Step S215 may additionally or alternatively include upsampling or downsampling digital transmit signals to increase or decrease sampling rate. In one instance, S215 includes modifying the sampling rate of a digital transmit signal to match a sampling rate of an RF receiver of a full-duplex radio.

In one implementation, S215 includes modifying digital transmit signals by removing information unlikely to substantially affect the result of non-linear transformation. This may include, for instance, removing signal components if they do not represent a change above some change threshold over previous signal components. As another example, if digital transmit signals correspond to a particular amplitude of an output analog signal, digital signal data corresponding to an amplitude below some amplitude threshold may be removed.

If multiple digital transmit signals are received in S210 (e.g. from both a transmit line before the RF transmitter and a analog signal sampler), S215 may include combining the signals in any suitable way or may select one signal over another. For instance, two signals may be combined by taking the average of the two signals or summing them. As another example, S215 may include selecting an analog signal sampler originating digital transmit signal over the transmit-path digital transmit signal above a certain transmitter power, and vice versa at or below that transmitter power.

Step S215 may additionally or alternatively perform any pre-processing to prepare digital transmit signals for non-linear and/or linear transformation. This may include scaling, shifting, and/or otherwise modifying the digital transmit signals. If digital transmit signals undergo more than one type of transformation as part of the method 200 (e.g. both linear and non-linear transformation), S215 may include providing different versions of the digital transmit signals for different transformation types. As a first example, S215 may include providing identical signals for linear and non-linear transformation. As a second example, S215 may include providing every fourth sample of a digital signal for non-linear transformation and every sample of a digital signal for linear transformation (this might be useful if the non-linear distortions of the signal change more slowly than the linear distortions). As a third example S215 may include splitting the sampled digital signal into "linear" and "non-linear" components, where "linear" and "non-linear" components correspond to components of the digital signal more likely to have an effect on linear distortions in received self-interference and non-linear distortions in received self-interference respectively.

Step S220 includes transforming the digital transmit signal into a non-linear self-interference signal according to a transform configuration. Step S220 functions to transform digital transmit signals into non-linear self-interference signals; that is, signals that represent a hypothesized contribution of non-linear self-interference to a received digital signal. Non-linear self-interference contributions may result from a variety of sources, including components in both RF receivers and RF transmitters of full-duplex radios (e.g., mixers, power amplifiers, ADCs, DACs, etc.). Further, non-linear self-interference contributions may vary randomly, or with environmental or input conditions (e.g. transmission power, ambient temperature, etc.).

Step S220 preferably includes transforming digital transmit signals through the use of mathematical models substantially similar to those described in the description of the system 100, but may additionally or alternatively transform digital transmit signals according to any model or set of models. Step S220 may additionally or alternatively include generating models for modeling non-linear self-interference contributions based on comparisons of sampled digital transmit signals to received signals (from the analog signal samples, the receive path, or any other suitable source).

Figure 10:
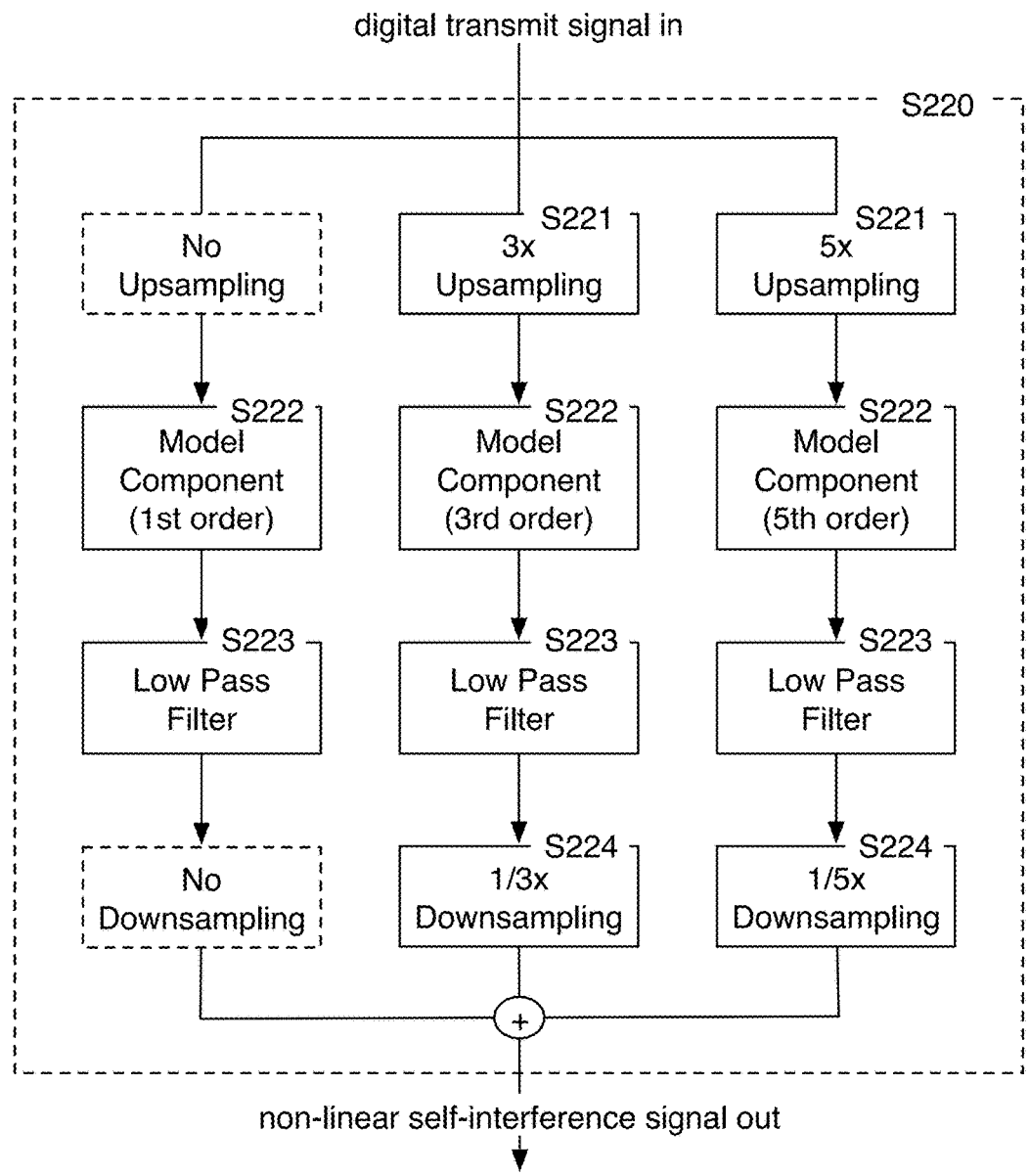
FIG. 10 is a flowchart representation of a non-linear transformation step of a method of a preferred embodiment.

In one embodiment of the invention, S220 transforms digital transmit signals through the use of an order-separated model similar to the one of the system 100 description as shown in FIG. 10. In this embodiment, S220 may include transforming digital transmit signals according to transform paths, where each transform path corresponds to a component of the order-separated model. Step S220 preferably includes transforming digital transmit signals for each transform path in parallel simultaneously, but may additionally or alternatively transform them serially and/or transform them at separate times. While S220 preferably includes transforming identical digital transmit signals for each transform path, the digital transmit signals may additionally or alternatively be processed in any suitable way (for instance, S220 may include splitting the digital transmit signal into components and passing separate components to each transform path).

For each transform path, S220 preferably includes upsampling the digital transmit signal S221, transforming the digital transmit signal with a model component S222, filtering the transformed signal S223, and downsampling the transformed signal S224. Additionally or alternatively, S220 may include only transforming the digital transmit signal with a model component S222 and/or filtering the transformed signal S223 (as with a first-order model component). Step S220 preferably also includes combining the transformed signals to form a single non-linear self-interference signal, but may additionally or alternatively not combine the transformed signals. Step S220 preferably combines non-linear interference signal components by adding them, but may additionally or alternatively combine them in any suitable way (e.g. scaling components before adding them and/or combining components multiplicatively).

Upsampling the digital transmit signal S221 functions to increase the number of samples contained within the digital transmit signal in order to reduce aliasing effects. Note that for the first order term of the model, upsampling may not be necessary. Step S221 preferably increases the number of samples contained within a digital transmit signal according to linear interpolation, but may additionally or alternatively use any suitable method. In one example, S221 includes upsampling the digital transmit signal by creating a sequence comprising the original samples separated by L−1 zeroes (where L the upsampling factor) and then passing the new signal through a finite impulse response (FIR) lowpass filter. In another example, S221 includes creating a sequence comprising the original samples separated from each other by L−1 new samples, where each new sample is modeled on how a DAC converts digital samples to an analog signal (e.g. if the output of the DAC is not exactly linear between outputs). For a transmit path (and model component) of order k, S221 preferably includes upsampling the digital transmit signal with an upsampling factor of k, but may additionally or alternatively upsample the digital transmit signal by any suitable factor.

Transforming the digital transmit signal with a model component S222 functions to transform the digital transmit signal into a non-linear interference signal component based on the part of the model producing an output of a particular signal order; for instance, a model component of order 3 corresponding to a GMP model might be represented as $$c_{n3}x[n]|x[n]|^2 + c_{n3}x[n]|x[n-m]|^2$$

Model components preferably include model terms of a single order only, but may additionally or alternatively include model terms of more than one order. Model components preferably comprise a set of expressions from a generalized memory polynomial (GMP) model, Volterra model, Wiener-Hammerstein model, or neural network model, but may additionally or alternatively comprise a part or whole of any suitable model or combination of models.

Filtering the transformed signal S223 functions to reduce the bandwidth of non-linear interference signal components to prepare the non-linear interference signal components for combination with digital signals received from the RF receiver (or other suitable source). Filtering is preferably implemented using a digitally implemented FIR lowpass filter, but may additionally or alternatively use any suitable type of filter (e.g., infinite impulse response (IIR) filters, Fourier-transform based filters). Step S223 preferably includes reducing the bandwidth of non-linear interference signal components to match the bandwidth of the digital baseband signal received from the RF transmitter, but may additionally or alternatively function to cap the bandwidth of non-linear interference signal components at any value below the maximum bandwidth of all non-linear interference signal components produced by model components. Step S223 preferably functions both to prepare the non-linear interference signal components for downsampling and to remove non-linear interference signal components not found in the received baseband signal (e.g., if the RF receiver has a corresponding lowpass filter for the baseband analog or digital signals or potentially a corresponding bandpass filter for the RF signal).

Downsampling the transformed signal S224 functions to reduce the number of samples contained within a non-linear interference signal component. Step S224 preferably includes downsampling non-linear interference signal components by simply removing signals at a particular interval (e.g., throwing away every other sample to halve the number of samples) but may additionally or alternatively downsample non-linear interference signal components by any suitable method. Step S224 preferably downsamples non-linear interference signal components to match the sampling rate of the received digital baseband signal, but may additionally or alternatively downsample non-linear interference signal components to any suitable sampling rate.

Step S225 includes transforming the digital transmit signal into a linear self-interference signal. Step S225 functions to transform sampled digital transmit signals into linear self-interference signals; that is, signals that represent a hypothesized contribution of linear self-interference to a received digital signal. Like with non-linear self-interference, linear self-interference contributions may result from a variety of sources. Non-linearity often stems from non-linear behavior of typical wireless transmitter components, while the actual wireless channel may often be very linear in response. While it is possible to model the entire self-interference signal with a larger non-linear model, it is often advantageous for performance reasons to use a hybrid model where the transmitter (and potentially receiver) non-linearities are accounted for by a smaller non-linear model and the wireless channel response is accounted for by a linear model. Splitting the models in this way may allow for a significant reduction in the number of calculations performed to generate a self-interference signal. Additionally, while non-linearities in a transmitter or receiver may be relatively stable over time (e.g., changing over periods of minutes or hours), linear self-interference effects present in the wireless channel may change very rapidly (e.g. over periods of milliseconds). Using split models allows for the simpler linear self-interference model to be tuned and adjusted at a fast rate without having to also tune and adjust the more computationally complex non-linear self-interference model. This concept may be extended to having separate non-linear models for the transmitter and receiver, as shown in FIG. 6.

Step S225 preferably includes transforming sampled digital transmit signals through the use of mathematical models adapted to model linear self-interference contributions of the RF transmitter, RF receiver, the wireless channel, and/or other sources. Examples of mathematical models that may be used include generalized memory polynomial (GMP) models, Volterra models, and Wiener-Hammerstein models; S225 may additionally or alternatively include the use of any combination or set of models.

Step S230 includes combining the non-linear self-interference signal with a digital receive signal. Step S230 functions to combine non-linear self interference signals with digital signals received by the RF receiver. Step S230 preferably includes combining non-linear self-interference signals with digital receive signals from an RF receiver of a full-duplex wireless communications system; additionally or alternatively, S230 may include combining linear self-interference signals with digital receive signals from an RF receiver of a full-duplex wireless communications system. Step S230 may additionally or alternatively include combining linear or non-linear self-interference signals with any suitable digital receive signal.

Step S230 may include performing post-processing to prepare self-interference signals for combination with digital receive signals; this may include scaling, shifting, filtering, and/or otherwise modifying the self-interference signals. For example, S230 may include processing self-interference signals with a lowpass filter designed to filter out high-frequency components (e.g., to match a corresponding bandwidth of the RF transmitter). Step S230 may include matching the sampling rate of self-interference signals with the sampling rate of the output of the RF receiver through upsampling and/or downsampling as previously described, but may additionally or alternatively not alter the sampling rate of self-interference signals or set the sampling rate of self-interference signals to a sampling rate other than that of RF receiver output.

Step S230 may include combining linear and non-linear self-interference signals in any suitable way, including combining non-linear or linear self-interference signal components. For example, S230 may include combining linear and non-linear self-interference signals as a weighted sum.

Step S240 includes dynamically adapting the transform configuration. Step S240 functions to update and/or change the transform configuration used in non-linear transformation (and potentially also the parameters of linear transformation) based on changes in signal or environmental conditions. The transform configuration is preferably as described in the system 100 description, but may additionally or alternatively comprise any parameter or set of parameters corresponding to non-linear or linear signal transformation performed in S220 and S225.

Dynamically adapting the transform configuration S240 may include setting an updated transform configuration by selecting from stored static configurations, from generating a new transform configuration, or by any other suitable manner or combination of manners. For example, S240 may include choosing from three static transform configurations based on their applicability to particular signal and/or environmental conditions (the first is appropriate for low transmitter power, the second for medium transmitter power, and the third for high transmitter power). As another example, S240 may include generating an updated configuration based on signal and/or environmental conditions; if a GMP model is used in non-linear transformation, the coefficients of a GMP model may be computed by a formula that takes transmitter power, temperature, and receiver power as input.

Step S240 may include setting transform configurations based on a variety of input data (whether transform configurations are selected from a set of static configurations or generated according to a formula or model). Input data may include static environmental and system data (e.g. receiver operating characteristics, transmitter operating characteristics, receiver elevation above sea-level), dynamic environmental and system data (e.g. current ambient temperature, current receiver temperature, average transmitter power, ambient humidity), and/or system configuration data (e.g. receiver/transmitter settings), signal data (e.g., digital transmit signal, RF transmit signal, RF receive signal, digital receive signal).

Step S240 may be performed at any time, but is preferably performed in response to either a time threshold or other input data threshold being crossed. For example, S240 may adapt transform configurations every ten seconds according to changed input data values. As another example, transform configurations may be re-set whenever transmitter power thresholds are crossed (e.g. whenever transmitter power increases by ten percent since the last transform configuration setting, or whenever transmitter power increases over some static value).

Step S240 may additionally or alternatively include cooperating with analog cancellation methods of a full-duplex radio if present; for instance, adapting transform configurations based on analog cancellation data, or coordinating transform configuration setting times based on analog cancellation configurations to reduce overall self-interference (or for any other suitable reason).

Step S240 preferably adapts transform configurations to reduce self-interference for a given transmit signal and set of system/environmental conditions. Step S240 may adapt transform configurations and/or transform-configuration-generating algorithms using analytical methods, online gradient-descent methods, least-mean-squares (LMS) methods, recursive-least-squares (RLS) methods, regularized and constrained solver methods (e.g. LASSO), and/or any other suitable methods. LMS methods may include regularization, one example LMS method includes leaky LMS; RLS methods may also include regularization. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

Step S240 may additionally or alternatively include adapting transform configurations based on test input scenarios (e.g. scenarios when the signal received by the RF receiver is known), scenarios where there is no input (e.g. the only signal received at the RF receiver is the signal transmitted by the RF transmitter), or scenarios where the received signal is unknown. In cases where the received signal is an unknown signal, transform configurations may be adapted based on historical received data (e.g. what the signal looked like ten seconds ago) or any other suitable information. Transform configurations may additionally or alternatively be updated based on the content of the transmitted signal.

Step S250 includes digitally pre-distorting the digital transmit signal using a digital pre-distortion circuit. Step S250 functions to increase transmitter efficiency and/or reduce the amount of non-linear self-interference cancellation required by a full-duplex radio. Because a large portion of non-linearities in full-duplex wireless communications systems arise from components of the RF transmitter, and these non-linearities may contribute to reduced power efficiency of the RF transmitter, it may be advantageous (both from the perspective of increasing transmitter efficiency and for reducing the amount of non-linear self-interference cancellation needed) to reduce the non-linear components of the RF transmit signal. An example of non-linear distortion occurring when converting a digital transmit signal to an RF transmit signal is as shown in FIG. 8A. One way to do this involves pre-distorting the digital transmit signal such that the distortions in the digital transmit signal serve to correct distortions introduced by the RF transmitter in converting the digital transmit signal to an RF transmit signal, as shown in FIG. 8B.

Step S250 preferably includes taking samples (which may be digital or analog) from the output of the RF transmitter to measure the non-linearity inherent in the RF transmitter output. Based on the RF transmitter output samples the digital transmit signal is transformed to create 'inverse' non-linearity in the signal (as shown in FIG. 8B). This 'inverse' non-linearity, when further transformed by the RF transmitter (in the process of converting the digital transmit signal to an RF transmit signal) reduces the non-linearity present in the final RF transmit signal.

Pre-distortion (or other linearization techniques) may be leveraged to reduce the complexity of digital self-interference cancellation. By performing pre-distortion after pre-processing in the signal path, as shown in FIG. 7, non-linearity in the receive signal path is reduced, and additionally, non-linear transformation does not need to transform the digital transmit signal to remove non-linearities introduced by digital pre-distortion.

Step S250 may additionally or alternatively include adapting the digital pre-distortion circuit to account for changing RF transmit signal distortion characteristics. Adapting the digital pre-distortion circuit is preferably done using substantially similar techniques to those used to update the transform configuration, but may additionally or alternatively be performed using any suitable technique or system. The pre-distortion characteristics of the digital pre-distortion circuit are preferably adapted according to samples of the RF transmit signal of the full-duplex wireless communication system, but may additionally or alternatively be adapted according to any suitable input.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for non-linear self-interference cancellation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for non-linear digital self-interference cancellation comprising:
    a pre-processor communicatively coupled to a digital transmit signal of a communication system that generates a first pre-processed digital transmit signal and a second pre-processed digital transmit signal from the digital transmit signal;
    a non-linear transformer that transforms the first pre-processed digital transmit signal into a non-linear self-interference signal according to a first transform configuration;
    a linear transformer that transforms the second pre-processed digital transmit signal into a linear self-interference signal according to a second transform configuration;
    a transform adaptor that sets the first and second transform configurations; and
    a post-processor that combines the non-linear self-interference signal and the linear self-interference signal with a digital receive signal of the communication system.

2. The system of claim 1, wherein the first pre-processed digital transmit signal and the second pre-processed digital transmit signal are non-identical.

3. The system of claim 2, wherein the pre-processor samples the digital transmit signal at a first sample rate; wherein the second pre-processed digital transmit signal is generated at the first sample rate; wherein the first pre-processed digital transmit signal is generated at a second sample rate; wherein the second sample rate is reduced from the first sample rate.

4. The system of claim 2, wherein the pre-processor splits the digital transmit signal into linear and non-linear components; wherein the first pre-processed digital transmit signal comprises the non-linear components; wherein the second pre-processed digital transmit signal comprises the linear components.

5. The system of claim 4, wherein the pre-processor samples the digital transmit signal at a first sample rate; wherein the second pre-processed digital transmit signal is generated at the first sample rate; wherein the first pre-processed digital transmit signal is generated at a second sample rate; wherein the second sample rate is reduced from the first sample rate.

6. The system of claim 5, wherein the linear components change at a first change rate; wherein the non-linear components change at a second change rate; wherein the transform adaptor sets the second sample rate based on the first and second change rates.

7. The system of claim 1, further comprising an analog signal sampler; wherein the digital transmit signal is converted to a radio-frequency (RF) analog transmit signal by an RF receiver; wherein the analog signal sampler generates an analog-sourced digital transmit signal from the RF analog transmit signal; wherein the transform adaptor sets the first and second transform configurations based on the analog-sourced digital transmit signal.

8. The system of claim 7, wherein the pre-processor generates the first and second pre-processed digital transmit signals from a combination of the digital transmit signal and the analog-sourced digital transmit signal.

9. The system of claim 7, wherein the pre-processor generates the first and second pre-processed digital transmit signals from the digital transmit signal when transmitter power is below a threshold level; wherein the pre-processor generates the first and second pre-processed digital transmit signals from the analog-sourced digital transmit signal when transmitter power is above or equal to the threshold level.

10. The system of claim 7, further comprising a digital pre-distortion circuit coupled to digital transmit signal after the pre-processor that distorts the digital transmit signal to create inverse non-linearity in the digital transmit signal; wherein the inverse non-linearity results in reduced non-linearity when the digital transmit signal is converted to the RF analog transmit signal by the RF receiver.

11. A method for non-linear digital self-interference cancellation comprising:
    receiving a digital transmit signal of a communication system;
    pre-processing the digital transmit signal to generate first and second pre-processed digital transmit signals from the digital transmit signal;
    transforming the first pre-processed digital transmit signal into a non-linear self-interference signal according to a first transform configuration;
    transforming the second pre-processed digital transmit signal into a linear self-interference signal according to a second transform configuration; and
    combining the linear and non-linear self-interference signals with a digital receive signal of the communication system.

12. The method of claim 11, wherein the first pre-processed digital transmit signal and the second pre-processed digital transmit signal are non-identical.

13. The method of claim 12, further comprising sampling the digital transmit signal at a first sample rate; generating the second pre-processed transmit signal at the first sample rate; and generating the first pre-processed transmit signal at a second sample rate; wherein the second sample rate is reduced from the first sample rate.

14. The method of claim 12, further comprising splitting the digital transmit signal into linear and non-linear components; wherein the first pre-processed digital transmit signal comprises the non-linear components; wherein the second pre-processed transmit signal comprises the linear components.

15. The method of claim 14, further comprising sampling the digital transmit signal at a first sample rate; generating the second pre-processed transmit signal at the first sample rate; and generating the first pre-processed transmit signal at a second sample rate; wherein the second sample rate is reduced from the first sample rate.

16. The method of claim 15, wherein the linear components change at a first change rate; wherein the non-linear components change at a second change rate; further comprising setting the second sample rate based on the first and second change rates.

17. The method of claim 11, further comprising converting the digital transmit signal to a radio-frequency (RF) analog transmit signal; generating an analog-sourced digital transmit signal from the RF analog transmit signal; and setting the first and second transform configurations based on the analog-sourced digital transmit signal.

18. The method of claim 17, wherein generating the first and second pre-processed digital transmit signals comprises generating the first and second pre-processed digital transmit signals from a combination of the digital transmit signal and the analog-sourced digital transmit signal.

19. The method of claim 17, wherein generating the first and second pre-processed digital transmit signals comprises generating the first and second pre-processed digital transmit signals from the digital transmit signal when transmitter power is below a threshold level; wherein generating the first and second pre-processed digital transmit signals comprises generating the first and second pre-processed digital transmit signals from the analog-sourced digital transmit signal when transmitter power is above or equal to the threshold level.

20. The method of claim 17, further comprising distorting the digital transmit signal to create inverse non-linearity in the digital transmit signal; wherein the inverse non-linearity results in reduced non-linearity when the digital transmit signal is converted to the RF analog transmit signal.

* * * * *